United States Patent
Yamano

(10) Patent No.: US 8,686,961 B2
(45) Date of Patent: Apr. 1, 2014

(54) ELECTRONIC APPARATUS, PROCESSING METHOD, AND PROGRAM

(75) Inventor: Ikuo Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 291 days.

(21) Appl. No.: 13/151,553

(22) Filed: Jun. 2, 2011

(65) Prior Publication Data

US 2012/0026110 A1 Feb. 2, 2012

(30) Foreign Application Priority Data

Jul. 28, 2010 (JP) ................................. 2010-168925

(51) Int. Cl.
*G06F 3/041* (2006.01)

(52) U.S. Cl.
USPC ............ 345/173; 345/168; 345/174; 715/702

(58) Field of Classification Search
USPC .................................................. 345/173–183
See application file for complete search history.

(56) References Cited

U.S. PATENT DOCUMENTS

| 2007/0152976 | A1* | 7/2007 | Townsend et al. ............ 345/173 |
| 2008/0244450 | A1 | 10/2008 | Hisada et al. |
| 2010/0321321 | A1* | 12/2010 | Shenfield et al. ............ 345/173 |
| 2011/0302491 | A1* | 12/2011 | Griffin et al. ................. 715/702 |

FOREIGN PATENT DOCUMENTS

JP  2008-243128  10/2008

* cited by examiner

*Primary Examiner* — Kevin M Nguyen
*Assistant Examiner* — Kenneth B Lee, Jr.
(74) *Attorney, Agent, or Firm* — Oblon, Spivak, McClelland, Maier & Neustadt, L.L.P.

(57) ABSTRACT

An electronic apparatus includes a casing, a movement detection sensor that detects a movement of the casing, an input unit having an input operation surface, a pressing force detection sensor that detects a pressing force applied to the input unit through the input operation surface, and a control unit. The input unit is provided to the casing and capable of detecting an input operation position within the input operation surface. The control unit judges whether one of the pressing force detected and an amount of a change based on the change in the pressing force exceeds a first threshold value, performs a process of an input determination in a case where the one of the pressing force and the amount of the change in the pressing force exceeds the first threshold value, and changes the first threshold value in accordance with a degree of the movement of the casing detected.

8 Claims, 13 Drawing Sheets

ELECTRONIC APPARATUS, PROCESSING METHOD, AND PROGRAM

BACKGROUND

The present disclosure relates to a technique of an electronic apparatus and the like equipped with a touch panel or a touch pad as an input unit.

In related art, electronic apparatuses such as a PDA, a mobile phone, and a laptop PC, which are equipped with a touch panel, a touch pad, or the like as an input unit, are widely known.

There is a problem in that an input operation with a touch panel or a touch pad is more likely to cause an input operation error due to a mistake of pressing, as compared to an input operation through pressing of hardware buttons of pressing type.

Japanese Patent Application Laid-open No. 2008-243128 (paragraphs 0022 to 0032) (hereinafter, referred to as Patent Document 1) discloses a technique relating to the aforementioned problem. In the touch panel apparatus disclosed in Patent Document 1, the sizes of operation buttons displayed on a screen are switched for each group, thereby preventing an input operation error due to a small size of an area in which the operation buttons are displayed.

SUMMARY

However, the input operation error caused by a mistake of pressing of a touch panel or a touch pad may be resulted from not only the small size of the area in which the operation buttons are displayed but also other factors. For example, when a user is taking a train, a sway or the like may cause the input operation error by the mistake of pressing of the touch panel or the touch pad.

In view of the above-mentioned circumstances, it is desirable to provide a technique of an electronic apparatus and the like capable of preventing the input operation error caused by the mistake of pressing of an input unit such as a touch panel and a touch pad with high accuracy.

According to an embodiment of the present disclosure, there is provided an electronic apparatus including a casing, a movement detection sensor, an input unit, a pressing force detection sensor, and a control unit.

The movement detection sensor is configured to detect a movement of the casing.

The input unit has an input operation surface, is provided to the casing, and is capable of detecting an input operation position within the input operation surface.

The pressing force detection sensor is configured to detect a pressing force applied to the input unit through the input operation surface.

The control unit is configured to judge whether one of the pressing force detected and an amount of a change based on the change in the pressing force exceeds a first threshold value, and perform a process of an input determination in a case where the one of the pressing force and the amount of the change in the pressing force exceeds the first threshold value.

Further, the control unit is configured to change the first threshold value in accordance with a degree of the movement of the casing detected.

In the electronic apparatus, if a user applies the pressing force to the input unit through the input operation surface with a user's finger, a pen, or the like, the pressing force detection sensor detects the pressing force applied to the input unit. Further, the control unit judges whether the pressing force detected or the amount of the change based on the change in the pressing force exceeds the first threshold value, and performs the process of the input determination in the case where the pressing force detected or the amount of the change in the pressing force exceeds the first threshold value.

By the above process, in the electronic apparatus, the touching of the input operation surface of the input unit by the user is not enough to carry out the input determination process. If the user further presses the input operation surface, the input determination process is carried out. Thus, it is possible to prevent an input operation error due to a mistake of pressing the input unit.

Further, in the electronic apparatus, the movement of the casing is detected by the movement detection sensor, and the first threshold value is changed by the control unit in accordance with the degree of the movement of the casing. With this structure, for example, in the case where a large movement of the casing occurs due to shaking of a train or the like, the first threshold value can be set to be large, it is possible to prevent the input operation error due to the mistake of pressing the input unit with higher accuracy.

In the electronic apparatus, the control unit judges whether the pressing force that exceeds the first threshold value falls below a second threshold value that is smaller than the first threshold value, and restricts, during a time period from when the pressing force exceeds the first threshold value until the pressing force falls below the second threshold value, the process of the input determination based on a fact that the pressing force exceeds the first threshold value.

In the electronic apparatus, during the time period from when the pressing force exceeds the first threshold value until the pressing force falls below the second threshold value, the process of the input determination based on the fact that the pressing force exceeds the first threshold value is restricted. Thus, for example, even if the change in the pressing force by the user is caused, and the pressing force changes in the vicinity of the first threshold value and exceeds the first threshold value, it is possible to prevent an unintentional input determination process from being performed.

In the electronic apparatus, the control unit may change the second threshold value in accordance with the degree of the movement of the casing.

With this structure, a difference between the first threshold value and the second threshold value becomes large, with the result that it is possible to prevent the pressing force from not falling below the second threshold value, even if the user weakens the pressing force applied to the input unit through the input operation surface.

In the electronic apparatus, the control unit may judge whether a predetermined time period elapses from when the pressing force exceeds the first threshold value before the pressing force falls below the second threshold value, and in a case where the predetermined time period elapses, perform the process of the input determination in a predetermined cycle during a time period from when the predetermined time period elapses until the pressing force falls below the second threshold value.

With this structure, the user can perform a continuous input by continuously pressing the input unit (long pressing).

In the electronic apparatus, the control unit may change the predetermined time period in accordance with the degree of the movement of the casing.

With this structure, it is possible to prevent the continuous input by the long pressing from being started unintentionally.

In the electronic apparatus, the control unit may judge whether the pressing force turns into an increase from a decrease, in a case where the pressing force turns into the increase, calculate the amount of the change in the pressing force with the pressing force at a time of turning into the increase as a reference, judge whether the calculated amount of the change in the pressing force exceeds the first threshold value, and in a case where the change in the pressing force exceeds the first threshold value, perform the process of the input determination.

In the electronic apparatus, the control unit may calculate the amount of the change in the pressing force during a predetermined time period, judge whether the calculated amount of the change in the pressing force exceeds the first threshold value, and perform the process of the input determination in a case where the amount of the change in the pressing force exceeds the first threshold value.

According to another embodiment of the present disclosure, there is provided a processing method including detecting a movement of a casing.

A pressing force applied to an input unit through an input operation surface is detected. The input unit has the input operation surface, is provided to the casing, and is capable of detecting an input operation position within the input operation surface.

It is judged whether one of the pressing force detected and an amount of a change based on the change in the pressing force exceeds a first threshold value.

A process of an input determination is performed in a case where the one of the pressing force and the amount of the change in the pressing force exceeds the first threshold value.

The first threshold value is changed in accordance with a degree of the movement of the casing detected.

According to another embodiment of the present disclosure, there is provided a program that causes an electronic apparatus to execute detecting a movement of a casing.

The program causes the electronic apparatus to detect a pressing force applied to an input unit through an input operation surface. The input unit has the input operation surface, is provided to the casing, and is capable of detecting an input operation position within the input operation surface.

The program causes the electronic apparatus to judge whether one of the pressing force detected and an amount of a change based on the change in the pressing force exceeds a first threshold value.

The program causes the electronic apparatus to perform a process of an input determination in a case where the one of the pressing force and the amount of the change in the pressing force exceeds the first threshold value.

Further, the program causes the electronic apparatus to change the first threshold value in accordance with a degree of the movement of the casing detected.

As described above, according to the embodiments of the present disclosure, it is possible to provide the technique of the electronic apparatus and the like capable of preventing the input operation error due to the mistake of pressing of the input unit such as the touch panel and the touch pad with high accuracy.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

<First Embodiment>

Figure 1:
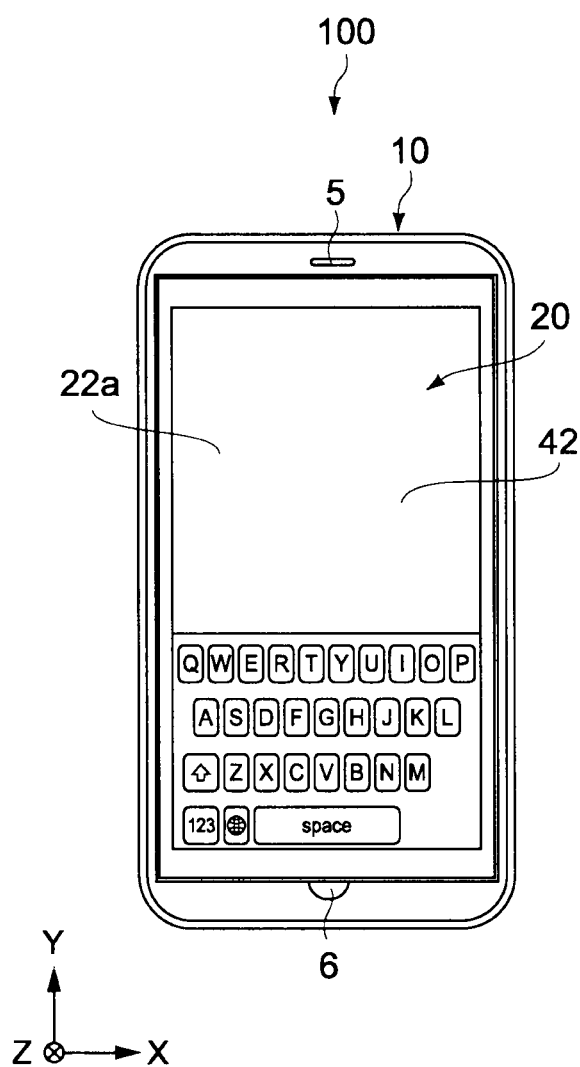
FIG. 1 is a front view showing a mobile phone according to an embodiment of the present disclosure.

FIG. 1 is a front view showing a mobile phone 100 according to a first embodiment.

As shown in FIG. 1, the mobile phone 100 has a casing 10 having a small thickness (in z-axis direction) and a rectangular parallelepiped shape. In the vicinity of an upper end portion of the casing 10 on the front side, a receiver opening 5 is formed, and in the vicinity of a lower end portion of the casing 10 on the front side, a talking opening 6 is formed.

Further, the mobile phone 100 has a display panel 42 in the casing 10. In the example shown in FIG. 1, in a lower region on a screen of the display panel 42, a software keyboard is displayed.

Figure 2:
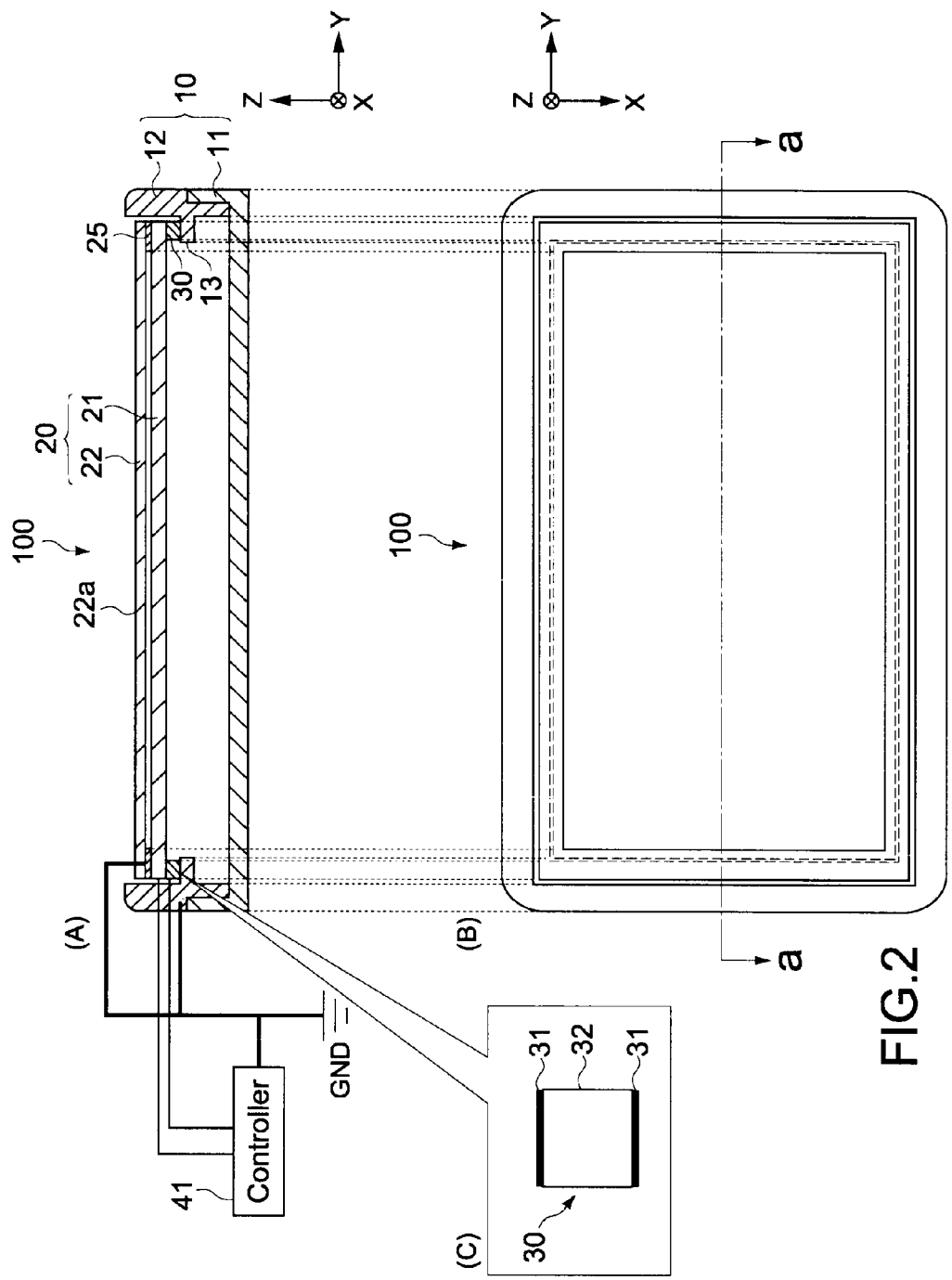
FIG. 2 is a diagram for explaining an internal structure of the mobile phone according to the embodiment of the present disclosure.

FIG. 2 is a diagram for explaining the internal structure of the mobile phone 100.

Part (A) of FIG. 2 shows a cross-sectional view of the mobile phone 100 taken along the line a-a of Part (B) of FIG. 2, and Part (B) of FIG. 2 is a front view of the mobile phone 100. Part (C) of FIG. 2 is an enlarged cross-sectional view of a pressure sensitive sensor 30 shown in Part (A) of FIG. 2. It should be noted that in FIG. 2, the display panel 42 and other parts are omitted to make the figure more visible.

As shown in Parts (A) and (B) of FIG. 2, the mobile phone 100 has the casing 10, a capacitive touch panel 20, and the pressure sensitive sensor 30. As shown in Part (C) of FIG. 2, the pressure sensitive sensor 30 includes two electrodes 31 and an elastic body 32, and is connected to a ground of a controller 41.

The casing 10 includes a base casing 11 having a tray shape and a frame-shaped conductive casing 12, which is fitted to the base casing 11 in an upper portion (in z-axis direction) of the base casing 11. The base casing 11 is made of an insulating material such as resin, for example. On the other hand, the conductive casing 12 is made of a conductive material, and has aluminum, conductive rubber, conductive carbon, and the like as main components.

The conductive casing 12 is provided so as to cover a side peripheral portion of the pressure sensitive sensor 30 on the outer circumferential side of the pressure sensitive sensor 30. In the case where a finger of the user approaches the conductive casing 12 from the side surface of the casing 10, the conductive casing 12 shuts off an electrical connection between the finger and the pressure sensitive sensor 30.

The conductive casing 12 has a projection portion 13 formed thereon. The projection portion 13 projects on an XY plane and supports the pressure sensitive sensor 30 and the touch panel 20 from underneath. Further, in the case where the finger of the user approaches the casing 10 from the lower side of the casing 10, the projection portion 13 shuts off an electrical connection between the finger and the pressure sensitive sensor 30. The conductive casing 12 is connected to the ground to shut off the electrical connection between the finger and the pressure sensitive sensor 30.

The touch panel 20 (input unit) has a touch panel main body 21 and a top plate 22 that covers the touch panel main body 21 in an upper part of the touch panel main body 21 to protect the touch panel main body 21.

The touch panel 20 is a capacitive touch panel and has, on an upper surface of the top plate 22, an input operation surface 22a for performing an input with the finger, a stylus pen, or the like by the user. The touch panel 20 detects a contact position with a finger or the like within the input operation surface 22a. It should be noted that, although not shown in FIG. 2, the display panel 42 is formed between the touch panel 20 and the base casing 11. In accordance with a content displayed on the display panel 42, the user touches or presses a predetermined position within the input operation surface 22a of the touch panel 22 with the finger, the pen, or the like. The touch panel 20 has a polyimide substrate, a PET film substrate, a glass substrate, or the like.

Between the touch panel main body 21 and the top plate 22, a conductive film 25 having conductivity is formed. The conductive film 25 is a thin film which is formed by vapor deposition, for example. The conductive film 25 is formed into a rectangular frame shape like the pressure sensitive sensor 30 having the rectangular frame shape. With this structure, the conductive film 25 covers the upper part of the pressure sensitive sensor 30. It should be noted that the conductive film 25 is provided only to a peripheral portion of the touch panel 20, so the conductive film 25 does not affect the position detection of the touch panel 20.

To shut off the electrical connection between the pressure sensitive sensor 30 and the finger, the conductive film 25 is connected to the ground. Like the conductive casing 12, the conductive film 25 has aluminum, conductive rubber, conductive carbon, and the like as the main components, for example. The conductive film 25 may have the same material as the conductive casing 12 or may have a different material therefrom as the main component.

In the example shown in FIG. 2, the conductive film 25 is formed between the touch panel main body 21 and the top plate 22. However, the conductive film 25 may be formed between the pressure sensitive sensor 30 and the touch panel main body 21, as long as the conductive film 25 is formed on the pressure sensitive sensor 30.

The pressure sensitive sensor 30 (pressing force detection sensor) is formed into the rectangular frame shape. The elastic body 32 is deformed (contracted) by applying a pressure to the touch panel 20 through the input operation surface 22a by the pressing with the finger, the stylus pen, or the like. the elastic body 32 is contracted, thereby changing the distance between the two electrodes 31, with the result that a capacitance between the electrodes 31 is changed. The capacitance of the pressure sensitive sensor 30 is transmitted to the controller 41. As the elastic body 32, for example, a rubber elastic body or the like is used. As the material of the rubber, for example, urethane rubber, silicone rubber, or the like is used.

On the surface of the electrodes 31, an insulator is formed. As the insulator, a double coated tape or the like is used.

In this embodiment, with the use of the conductive casing 12 (including the projection portion 13) and the conductive film 25, it is possible to shut off the electrical connection between the pressure sensitive sensor 30 and the finger of the user. As a result, the pressure sensitive sensor 30 can accurately detect the change in the capacitance which is based on the pressing of the touch panel 20 by the user. Thus, it is possible to accurately detect the pressing force against the touch panel 20 by the user.

Figure 3:
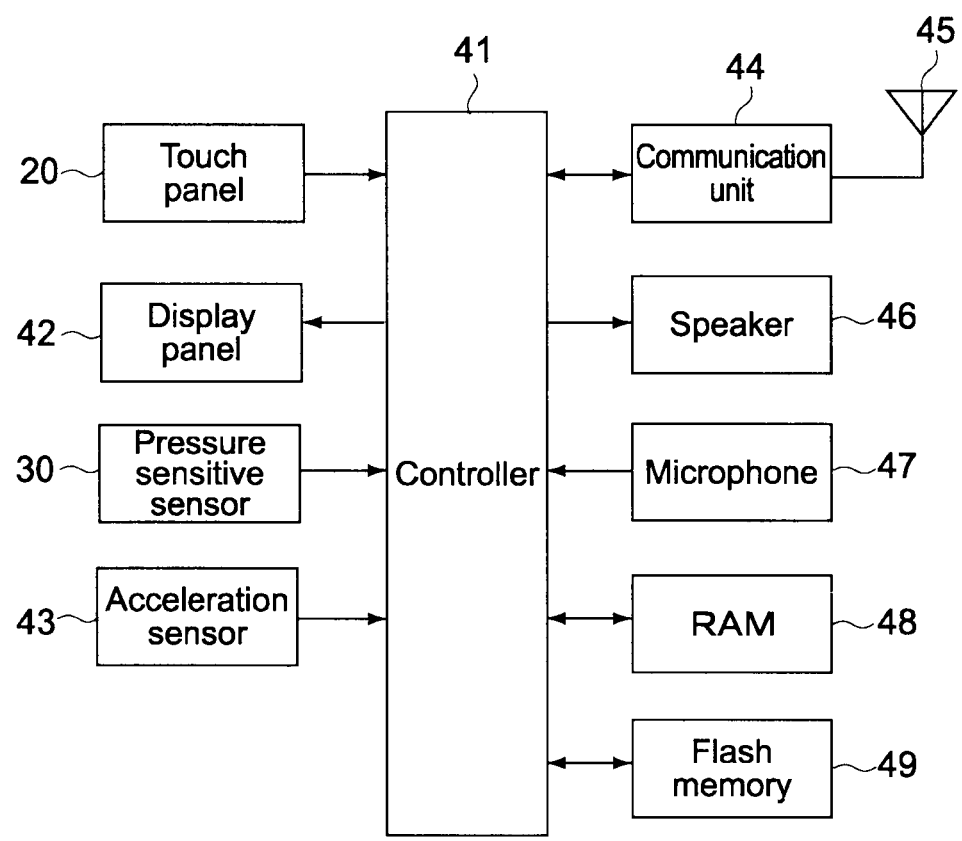
FIG. 3 is a block diagram showing an electrical structure of the mobile phone according to the embodiment of the present disclosure.

FIG. 3 is a block diagram showing the electrical structure of the mobile phone 100.

As shown in FIG. 3, the mobile phone 100 has an acceleration sensor 43, a communication unit 44, an antenna 45, a speaker 46, a microphone 47, a RAM 48, and a flash memory 49, in addition to the controller 41, the touch panel 20, the display panel 42, and the pressure sensitive sensor 30 described above.

The acceleration sensor 43 (movement detection sensor) is a sensor which is provided in the casing 10 and detects the movement of the mobile phone 100 (casing 10). As the acceleration sensor 43, for example, a piezoresistive acceleration sensor, a piezoelectric acceleration sensor, or a capacitive acceleration sensor may be used.

Further, as the acceleration sensor 43, modes may be provided in which an acceleration in one axis direction, in two axis directions perpendicular to each other, or in three axis directions perpendicular to each other can be detected. The acceleration sensor 43 may have any mode, but is structured so as to be capable of detecting at least the acceleration applied to the mobile phone 100 in the direction (z-axis direction) in which the touch panel 20 is pressed by the user.

It should be noted that in this embodiment, a one-axis acceleration sensor 43 that detects the acceleration in the z-axis direction is used for the sake of convenience.

The antenna 45 transmits and receives radio waves for talking or packet communication. The communication unit 44 performs a frequency conversion of the radio waves transmitted and received by the antenna 45, a modulation and a demodulation thereof, and other processes.

The speaker 46 includes a digital analog converter, an amplifier, and the like. The speaker 46 performs a digital analog conversion process and an amplification process with respect to audio data for talking which is input from the controller 41, and outputs audio through the receiver opening 5.

The microphone 47 includes an analog digital converter and the like. The microphone 47 converts analog audio data which is input from the user through the talking opening 6 to digital audio data, and outputs the data to the controller 41. The digital audio data which is output to the controller 41 is coded and then transmitted through the communication unit 44 and the antenna 45.

The RAM 48 (random access memory) is a volatile memory used as a work area for the controller 41 and temporarily stores various programs and various data items which are used for the process of the controller 41.

The flash memory 49 is a non-volatile memory that stores various programs and various data items which are necessary for the process of the controller 41.

The controller 41 (control unit) is formed of a CPU (central processing unit) or an MPU (micro processing unit), for example. The controller 41 performs overall control of respective units of the mobile phone 100 and performs various operations on the basis of various programs.

For example, the controller 41 calculates the pressing force with respect to the touch panel 20 by the user from the amount of change in capacitance detected by the pressure sensitive sensor 30 and calculates the contact position within the input operation surface 22a from the change in the capacitance detected by the touch panel 20. In addition, the controller 41 changes values such as an input determination threshold value and an input termination threshold value in accordance with the acceleration detected by the acceleration sensor 43. It should be noted that the details of the process of the controller 41 will be described later.

The display panel 42 is formed of a liquid crystal display or an EL (electro-luminescence) display, for example. The display panel 42 causes an GUI (graphical user interface) of menu buttons, a software keyboard, or the like to be displayed on a screen.

(Explanation of Operation)

Next, operations of the mobile phone 100 will be described.

(Processes of Input Determination, Input Termination, and the Like)

First, a description will be given on the operation when the controller 41 performs processes of an input determination, an input termination, and the like on the basis of the pressing force applied to the touch panel 20.

Figure 4:
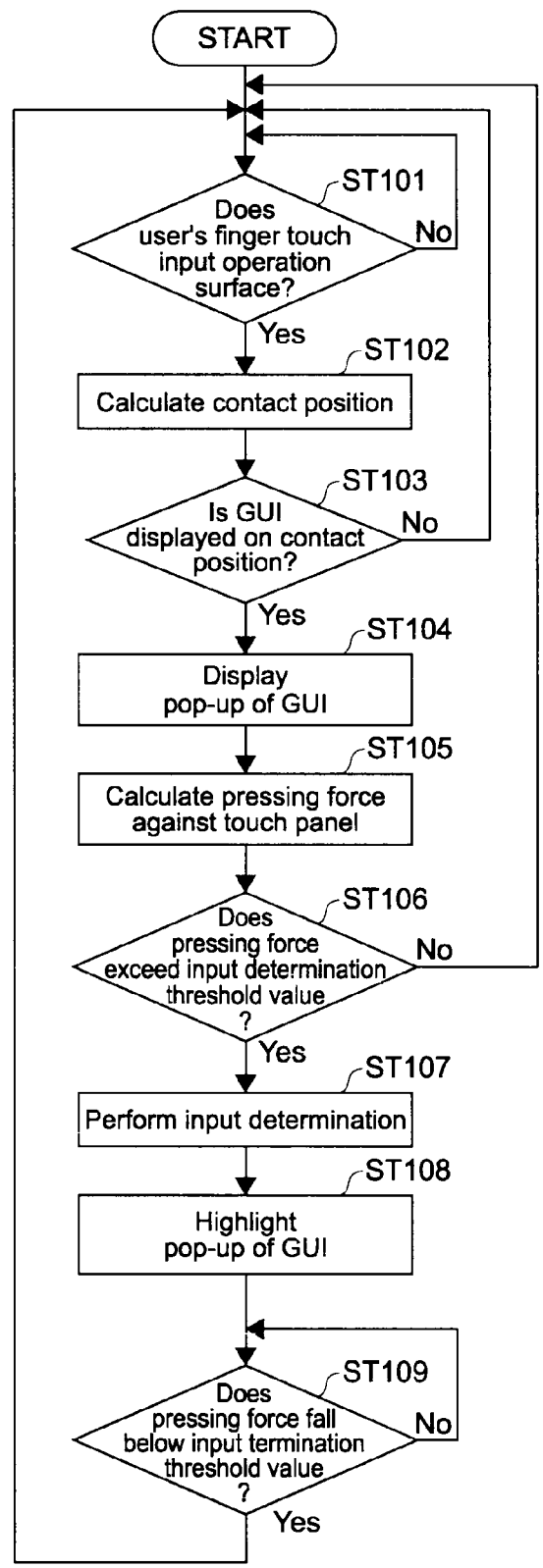
FIG. 4 is a flowchart showing an operation at the time when a controller performs processes of an input determination, an input termination, and the like on the basis of a pressing force applied to a touch panel.

FIG. 4 is a flowchart showing a process of the controller 41 at that time.

Figure 5:
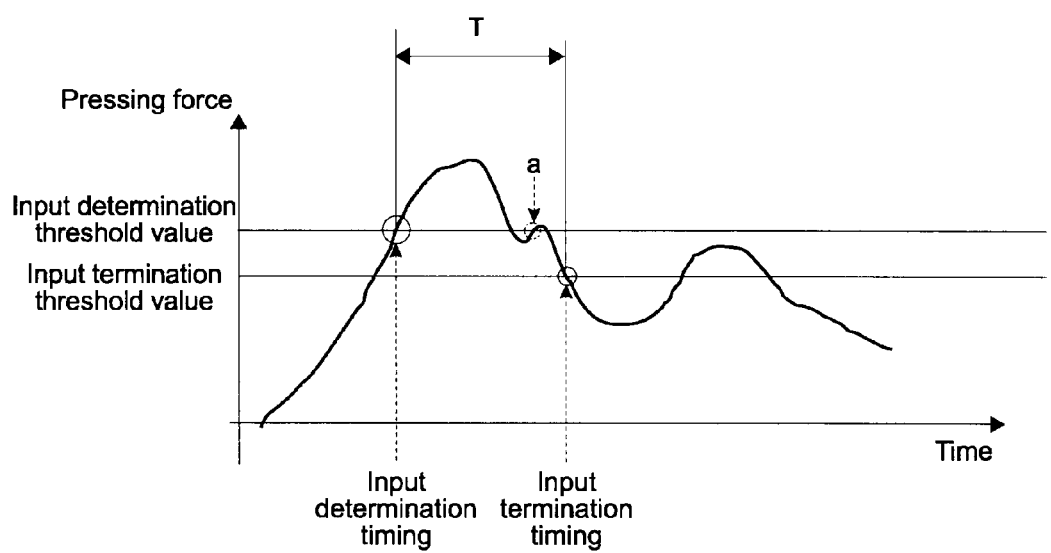
FIG. 5 is a diagram showing an example of the case where the pressing force applied to the touch panel changes with time and showing an input determination timing and an input termination timing in the case where the processes shown in FIG. 4 are performed.

FIG. 5 is a diagram showing an example in the case where the pressing force applied to the touch panel 20 changes with time, in which an input determination timing and an input termination timing in the case where the process shown in FIG. 4 is performed are shown.

Figure 6A:
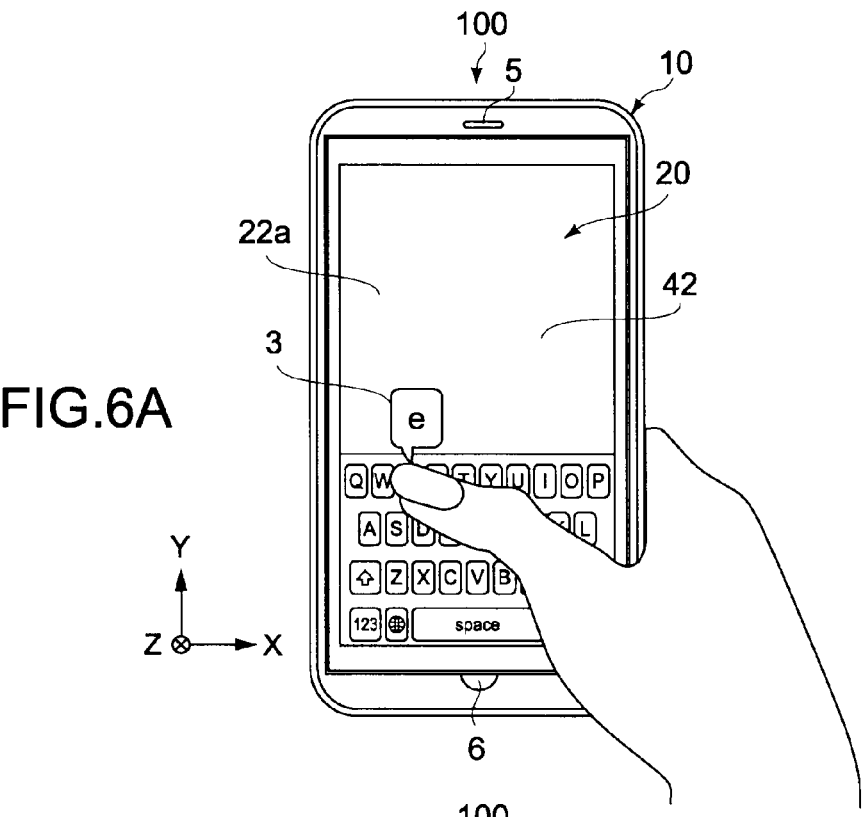
FIG. 6 are diagrams each showing the state in which a pop-up of a GUI displayed on a screen of the display panel is changed on the basis of the pressing force of the touch panel.
Figure 6B:
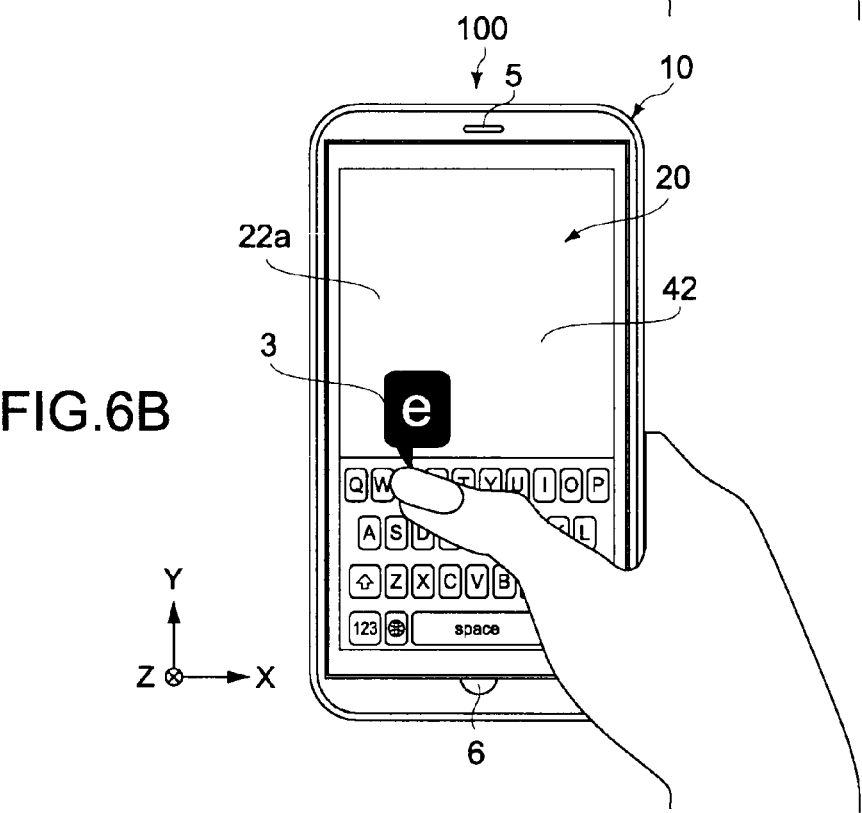

FIGS. 6A and 6B are diagrams showing the state in which a pop-up 3 of a GUI which is displayed on the screen of the display panel 42 is changed on the basis of the pressing force against the touch panel 20. FIG. 6A shows the state on the screen in the case where the user touches the input operation surface 22a of the touch panel 20, and FIG. 6B shows the state on the screen in the case where the user presses the input operation surface 22a of the touch panel 20. It should be noted that in FIGS. 6A and 6B, the case where the software keyboard is displayed in a lower area on the screen of the display panel 42 is shown as an example.

The controller 41 detects approach of the finger (or a stylus pen or the like (the same holds true hereinafter)) on the basis of the change in the capacitance detected by the touch panel 20 and judges whether the finger of the user touches the input operation surface 22a of the touch panel 20 or not (Step 101). In the case where it is judged that the finger of the user touches the input operation surface 22a (Yes in Step 101), the controller 41 calculates a contact position of the finger within the input operation surface 22a from the change in the capacitance detected by the touch panel 20 (Step 102).

When the contact position of the finger of the user is calculated, the controller 41 judges whether the GUI of the input keys or the like of the software keyboard is displayed on a position corresponding to the contact position (Step 103).

In the case where the GUI of the input keys or the like is not displayed on the position corresponding to the contact position (No in Step 103), the controller 41 performs the process of Step 101 again. On the other hand, in the case where the GUI of the input keys or the like is displayed on the position corresponding to the contact position (Yes in Step 103), the controller 41 causes the pop-up 3 of the GUI to be displayed as a preview on the screen of the display panel 42 (Step 104).

FIG. 6A shows the state in which, in the case where the finger of the user touches the position where an e input key is displayed, the pop-up 3 of the e input key is displayed on the screen of the display panel 42 as the preview (Steps 101 to 104).

It should be noted that the detection of the contact of the finger of the user is not enough for the controller 41 to perform the process of the input determination of the GUI of the input keys and the like.

Next, the controller 41 calculates the pressing force against the touch panel 20 by the user from the amount of change in the capacitance detected by the pressure sensitive sensor 30 (Step 105).

When the pressing force against the touch panel 20 applied by the user is calculated, the controller 41 judges whether the pressing force exceeds an input determination threshold value (first threshold value) or not (Step 106) (see, FIG. 5). In the case where the value of the pressing force does not exceed the input determination threshold value (No in Step 106), the process returns to Step 101, and the controller 41 performs the process of Step 101 again.

On the other hand, in the case where the value of the pressing force exceeds the input determination threshold value (Yes in Step 106), the controller 41 performs the input determination process of the GUI of the input keys or the like displayed on the position corresponding to the contact position of the finger of the user within the input operation surface 22a (Step 107).

Upon execution of the input determination process, the controller 41 temporarily highlights the pop-up 3 of the GUI which has been subjected to the input determination (Step 108).

In the example shown in FIG. 6B, in the case where the user touches the position where the e input key is displayed with the finger and presses the input operation surface 22a of the touch panel 20, the e input key is subjected to the input determination, and the pop-up 3 of the e input key is highlighted (Steps 101 to 108). In the example shown in FIG. 6B, the pop-up 3 of the e input key is enlarged, the base color of the pop-up 3 is changed from white to black, and the color of the character of e is changed from black to white. Thus, the pop-up 3 is highlighted.

The highlighting makes it possible for the user to easily recognize that the GUI displayed on the screen of the display panel 42 is subjected to the input determination.

It should be noted that the highlighting of the pop-up 3 is not performed only by enlarging the pop-up 3 or changing the color thereof, but may be performed by blinking the pop-up 3, for example.

Next, the controller 41 judges whether the pressing force that exceeds the input determination threshold value falls below an input termination threshold value (second threshold value) (Step 109). The input termination threshold value is set as a value smaller than the input determination threshold value (see, FIG. 5).

In the case where the pressing force falls below the input termination threshold value (Yes in Step 109), the process returns to Step 101 again, and the controller 41 performs the process of Step 101 and steps subsequent thereto again.

According to this embodiment, the user touches the input operation surface 22a of the touch panel 20 with the finger, thereby making it possible to display, as the preview, the pop-up 3 of the GUI of the input key or the like to be selected. The user checks the preview and then presses the input operation surface 22a of the touch panel 20, with the result that the user can select the GUI of the input key or the like. As a result, the mistake of pressing caused by the input operation error is prevented.

In addition, in this embodiment, at the time of the input determination, the pop-up 3 of the GUI displayed on the display unit is highlighted, so the user can easily recognize that the input determination process is carried out.

Further, in this embodiment, the input determination process is not carried out only by touching the input operation surface 22a of the touch panel 20 with the finger of the user. Therefore, the user can perform an input operation while touching the input operation surface 22a of the touch panel 20 with the finger. As a result, in the case where the user performs the input operation while holding the mobile phone 100 with one hand, the user can perform the input operation with respect to the touch panel 20 while stably holding the mobile phone 100 with one hand. Furthermore, in the case where the user performs the input operation for the mobile phone 100 with both hands, the user can perform the input operation while touching the input operation surface 22a of the touch panel 20 with fingers of the both hands, with the result that a user's burden at the time of the input operation is reduced.

Here, with reference to FIG. 5, in the mobile phone 100 according to this embodiment, a time period T from when the pressing force exceeds the input determination threshold value once until the pressing force falls below the input termination threshold value is set as an input determination state (Steps 106 to 109). When the pressing force falls below the input termination threshold value, the input determination state is released, and an input determination standby state is generated again, with the result that it becomes possible to perform an input again (Steps 109 to 106).

That is, during the time period T from when the pressing force exceeds the input determination threshold value once until the pressing force falls below the input termination threshold value, the process of input determination at a timing when the pressing force exceeds the input determination threshold value is restricted.

Therefore, for example, as indicated by the point a of FIG. 5, even if the condition occurs, in which the pressing force exceeds the input determination threshold value (condition in which the value of the pressing force shifts from a value equal to or lower than the input determination threshold value to a value higher than the input determination threshold value), during the time period T, the input determination process is not carried out.

Thus, it is possible to prevent the input determination process from being continuously performed due to frequent occurrences of the condition in which the pressing force changes in the vicinity of the input determination threshold value and exceeds the input determination threshold value by the changes of the pressing force by the user or by an influence of a noise of a signal from the pressure sensitive sensor 30.

Here, a vibration feedback may be given to the user by vibrations of a vibration unit (not shown) at the time of input determination and the input termination. As the vibration unit that generates the vibrations, a vibration unit having a motor and a weight that is provided so that the center of gravity is imbalanced with respect to a shaft of the motor is used, for example.

In this case, when the pressing force exceeds the input determination threshold value, and when the pressing force falls below the input termination threshold value, the controller 41 drives the vibration unit. Thus, in the input operation of the touch panel 20, the user obtains the same feeling of the operation as the operation of the hardware button which generates a feeling of clicking.

Further, the user can more easily recognize that the input determination process is carried out thanks to the vibration feedback at the time of the input determination. Furthermore, by the vibration feedback at the time of the input termination, the user can easily recognize that the input is terminated (that is, the state in which an input is possible again is caused).

It should be noted that the controller 41 may set the degree of the vibration of the vibration unit or a vibration pattern thereof to be different between the case of the input determination and the case of the input termination.

(Change of Input Determination Threshold Value Based on Output from Acceleration Sensor 43)

Next, a description will be given on a process in the case where the controller changes the input determination threshold value on the basis of the output from the acceleration sensor 43.

Incidentally, when the user is taking a train or walking while holding the mobile phone 100 with the hand, a sway of the mobile phone 100 is caused. In the state where the sway of the mobile phone 100 is caused, the user unconsciously strongly holds the mobile phone 100, so a pressing force which is not intended by the user may be applied to the input operation surface 22a of the touch panel 20. Further, due to an influence of inertia applied to the mobile phone 100 or the body, the hand (finger) of the user and the mobile phone 100 may be moved relative to each other, with the result that the pressing force which is not intended by the user may be applied to the input operation surface 22a of the touch panel 20.

Here, an assumption is made that the input determination threshold value of the mobile phone 100 is constant. In this case, for example, if the sway of the mobile phone 100 is caused, the user strongly holds the mobile phone 100, and the pressing force which is not intended by the user may be applied to the input operation surface 22a, the input determination process may be carried out unintentionally.

In view of this, the mobile phone 100 according to this embodiment performs a process of changing the input determination threshold value on the basis of the output from the acceleration sensor 43.

Figure 7:
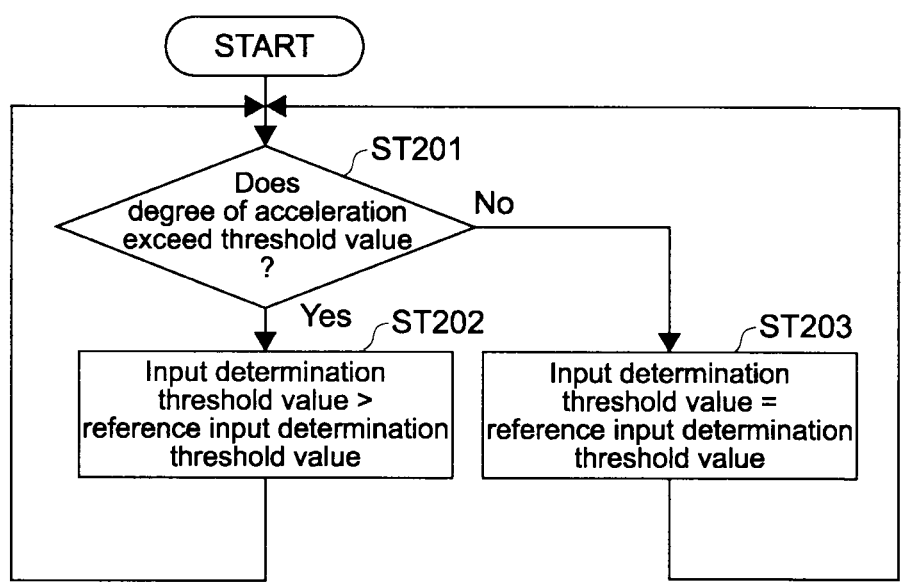
FIG. 7 is a flowchart showing a process in the case where the controller changes an input determination threshold value on the basis of an output from an acceleration sensor.

FIG. 7 is a flowchart showing the process in the case where the controller 41 changes the input determination threshold value on the basis of the output from the acceleration sensor 43.

Figure 8A:
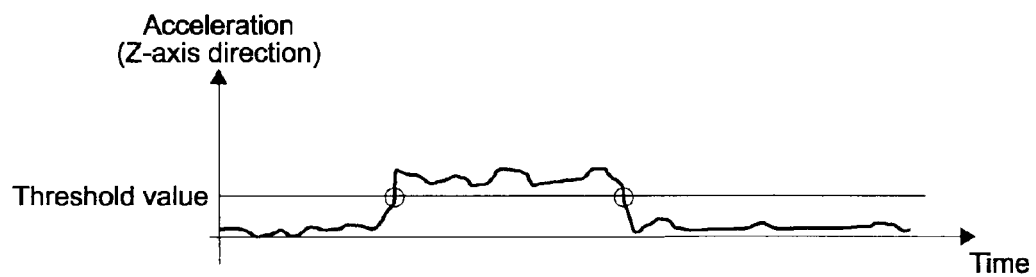
FIG. 8 are diagrams showing an example of the case where the input determination threshold value is changed in accordance with the degree of the acceleration.
Figure 8B:
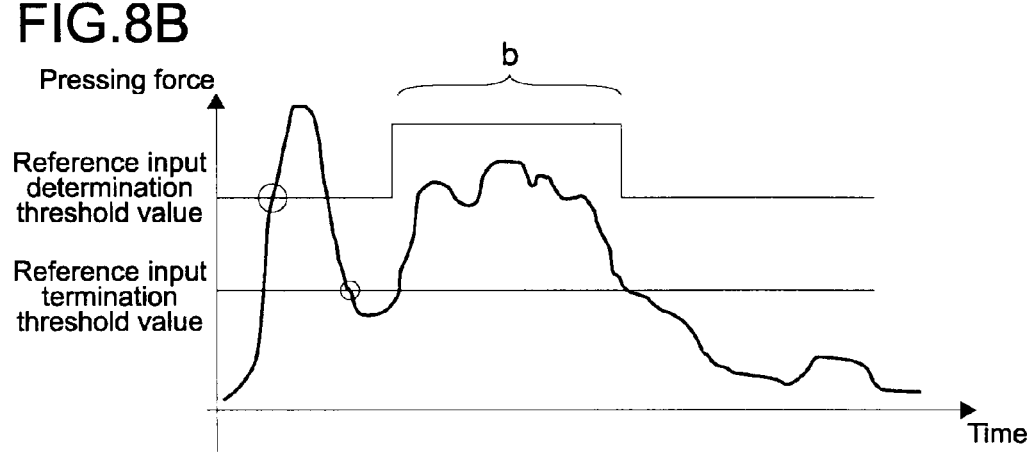

FIGS. 8A and 8B are supplemental diagrams for explaining the process shown in FIG. 7. FIG. 8A is a diagram showing an example of a temporal change of an acceleration in the z-axis direction, and FIG. 8B is a diagram showing an example of the case where the input determination threshold value is changed in accordance with the degree of the acceleration.

It should be noted that in the following description, a threshold value as a reference of the input determination threshold value is referred to as a reference input determination threshold value, and a threshold value as a reference of the input termination threshold value is referred to as a reference input termination threshold value.

The controller 41 judges whether the degree of the acceleration (z-axis direction) based on the output from the acceleration sensor 43 (one-axis acceleration sensor 43 that detects the acceleration in the z-axis direction) exceeds the threshold value or not (Step 201) (see, FIG. 8A).

For a value indicating the degree of the acceleration (z-axis direction), a value obtained by integrating an effective value of a value obtained by applying a high-pass filter to an output signal of the acceleration sensor 43 is used, for example. It should be noted that the output signal from the acceleration sensor 43 is caused to pass through the high-pass filter, thereby making it possible to remove a DC offset component due to a change in tilt of the mobile phone 100 from the output signal of the acceleration sensor 43 and to extract an acceleration component caused by the sway of the mobile phone 100.

In the case where the degree of the acceleration does not exceed the threshold value (No in Step 201), the controller 41 sets the reference input determination threshold value as the input determination threshold value (Step 203) (see, FIG. 8B).

On the other hand, in the case where the degree of the acceleration exceeds the threshold value (Yes in Step 201), the controller 41 sets, as the input determination threshold value, a value larger than the reference input determination threshold value (Step 202) (see, FIG. 8B).

Here, as a method of increasing the input determination threshold value, for example, a method of increasing the input determination threshold value stepwise (for example, in one step or two steps) in accordance with the degree of the acceleration may be used. Further, in accordance with the degree of the acceleration, a method of increasing the input determination threshold value in a linear function manner or a method of increasing the input determination threshold value in a multi-dimensional function manner may be used.

As described above, in this embodiment, in accordance with the degree of the acceleration applied to the mobile phone 100, the input determination threshold value becomes large.

For example, as shown in the part b of FIG. 8B, in the case where the acceleration applied to the mobile phone 100 is large due to shaking or the like of a train, even if the user unconsciously strongly holds the mobile phone 100, and the pressing force applied to the touch panel 20 through the input operation surface 22a is increased, the input determination process is not carried out, because the input determination threshold value is larger than the reference input determination threshold value. In this way, in the mobile phone 100 according to this embodiment, it is possible to prevent the input determination process from being unintentionally carried out with high accuracy.

In the above, the case where the input determination threshold value is changed is described. However, the input termination threshold value may be changed in the same way as the input determination threshold value.

Figure 9A:
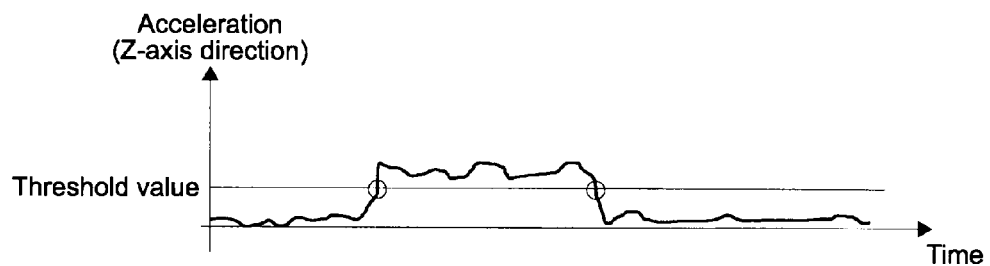
FIG. 9 are diagrams showing an example of the case where the input determination threshold value and an input termination threshold value are changed in accordance with the degree of the acceleration.
Figure 9B:
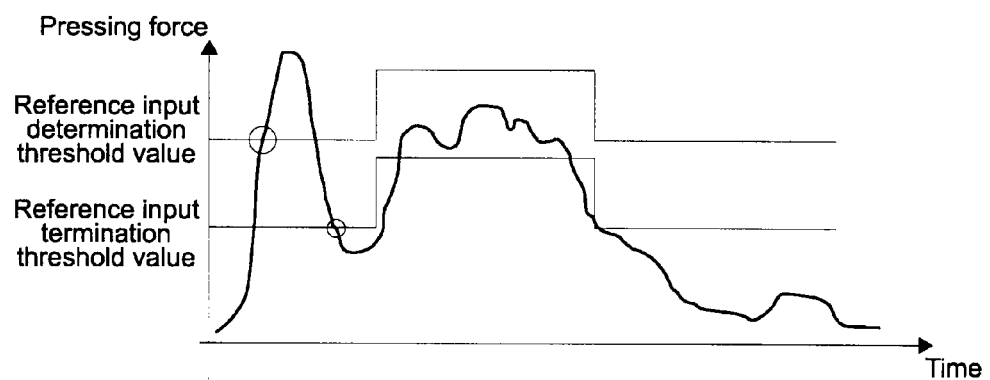

FIGS. 9A and 9B are diagrams for explaining this case, and showing an example in the case where both the input determination threshold value and the input termination threshold value are changed in accordance with the acceleration (z-axis direction).

In this case, when the degree of the acceleration (in the z-axis direction) does not exceed the threshold value, the controller 41 sets, as the input determination threshold value, the reference input determination threshold value, and sets, as the input termination threshold value, the reference input termination threshold value. On the other hand, in the case where the degree of the acceleration exceeds the threshold value, the controller 41 sets, as the input determination threshold value, a value larger than the reference input determination threshold value, and sets, as the input termination threshold value, a value larger than the reference input termination threshold value.

As a method of increasing the input termination threshold value, in accordance with the degree of the acceleration, a method of increasing the input termination threshold value stepwise, in a linear function manner, or in a multi-dimensional function manner is used, for example. It should be noted that, for the method of increasing the input termination threshold value, a method which is the same as the method of increasing the input determination threshold value is used typically.

By the process as described above, in accordance with the degree of the acceleration applied to the mobile phone 100, the input termination threshold value becomes large along with the input determination threshold value. As a result, a difference between the input determination threshold value and the input termination threshold value becomes large, so it is possible to prevent the pressing force from not falling below the input termination threshold value, even if the user weakens the pressing force applied to the touch panel 20 through the input operation surface 22a. That is, even if the user weakens the force applied to the touch panel 20, it is possible to prevent the input determination state from not being terminated and prevent the state from not being shifted to the state where a re-input is possible.

In the above, as an indicator that indicates the degree of the movement (sway) of the mobile phone 100, the case where the degree of the acceleration in the z-axis direction is used is described, but another case may be used. For example, as the indication that indicates the degree of the movement of the mobile phone 100, a combined value of accelerations in two-axis directions or three-axis directions perpendicular to each other may be used. In this case, as the acceleration sensor, a two-axis acceleration sensor or a three-axis acceleration sensor is used.

<Second Embodiment>

Next, a second embodiment of the present disclosure will be described. It should be noted that in the second and subsequent embodiments, a description on members and the like having the same structures and functions as the mobile phone 100 according to the first embodiment will be omitted or simplified.

In the second embodiment, unlike the first embodiment, in the case where the user presses the input operation surface 22a of the touch panel 20 for a prescribed time period T1 (see, FIG. 11) or more (long pressing), the input determination process is carried out in succession. Further, in the second embodiment, depending on the degree of the acceleration, the prescribed time period T1 is changed, unlike the first embodiment. Those different points will be mainly described.

(Continuous Input Through Long Pressing)

First, a description will be given on a process for performing a continuous input in the case where the user performs the long pressing of the input operation surface 22a of the touch panel 20.

Figure 10:
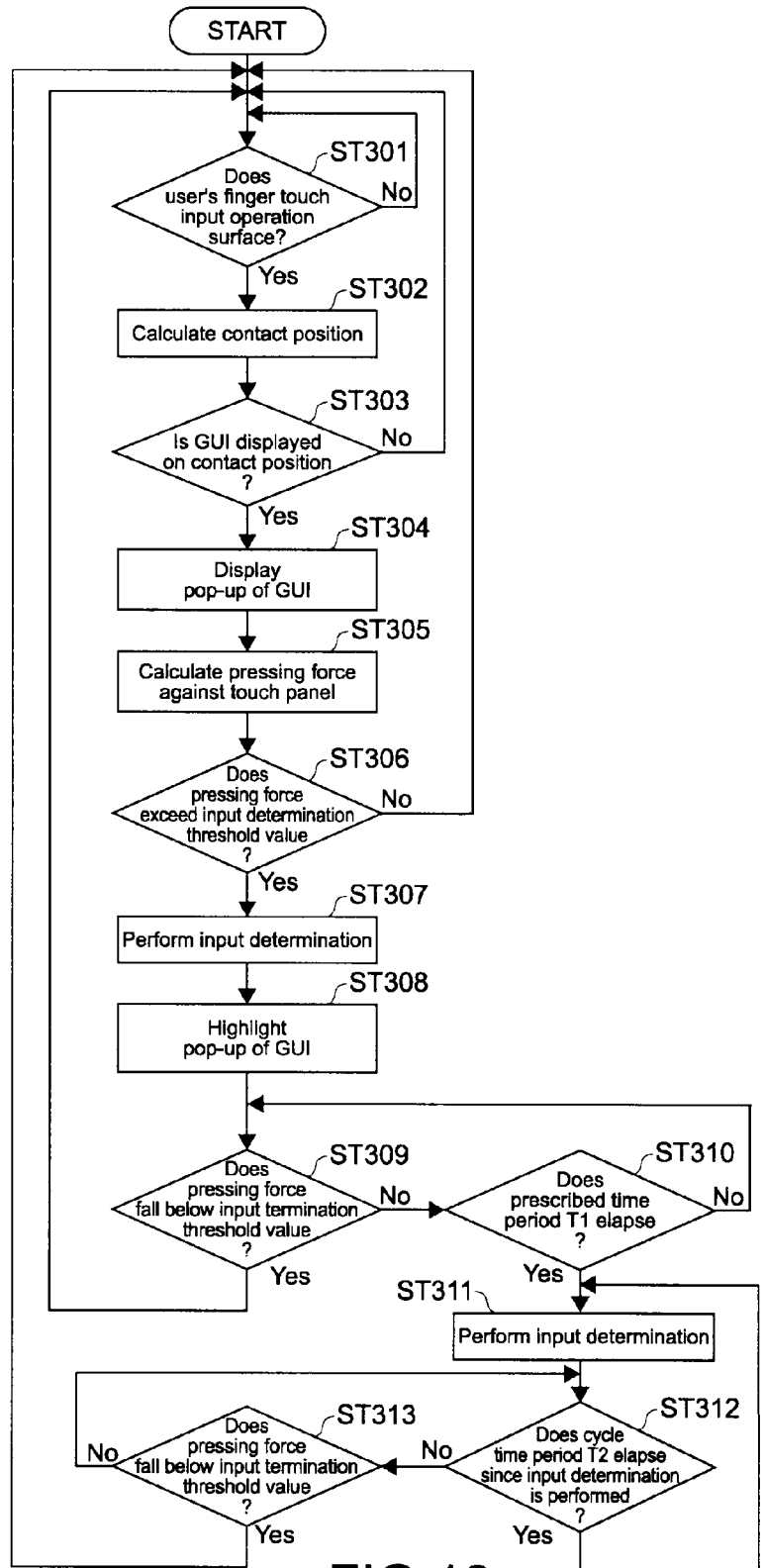
FIG. 10 is a flowchart showing an operation at the time of performing a continuous input process in the case where a user performs long pressing of an input operation surface of the touch panel.
Figure 11:
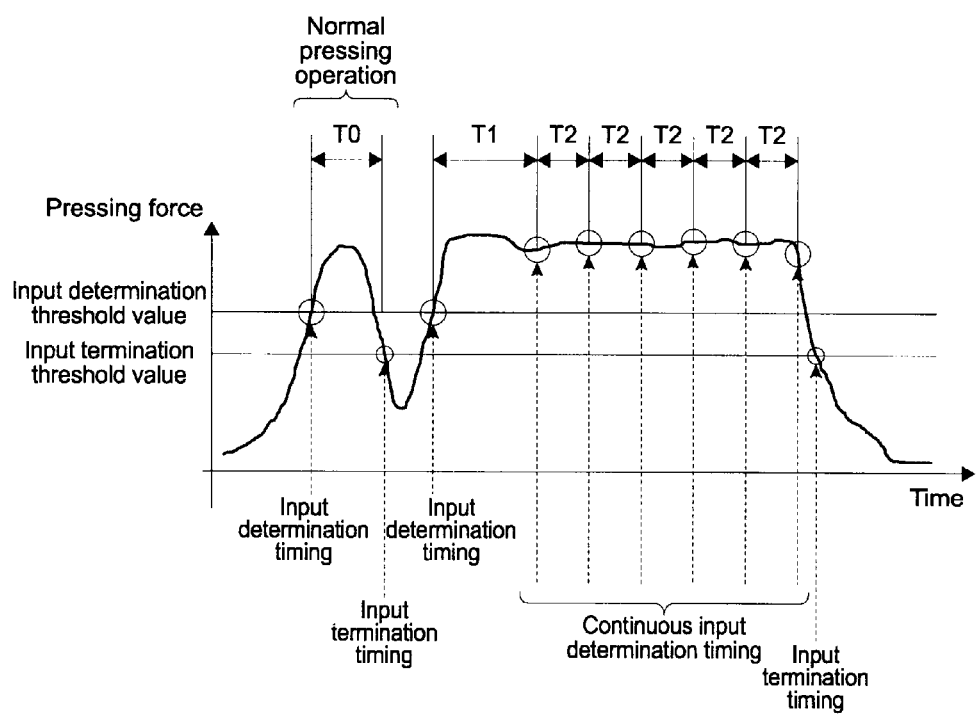
FIG. 11 is a diagram showing an example of a temporal change of the pressing force and showing a continuous input determination timing in the case where the process shown in FIG. 10 is performed.

FIG. 10 is a flowchart showing a process of the controller 41 at that time. FIG. 11 is a diagram showing an example of a temporal change of the pressing force, and showing continuous input determination timings in the case where the process shown in FIG. 10 is performed.

In Steps 301 to 309 shown in FIG. 10, the same process as the Steps 101 to 109 shown in FIG. 4 is performed.

In Step 306, the controller 41 judges whether the pressing force which is calculated on the basis of the amount of change in the capacitance detected by the pressure sensitive sensor 30 exceeds the input determination threshold value. In the case where the pressing force exceeds the input determination threshold value (Yes in Step 306), the controller 41 carries out the input determination process (Step 307) and highlights the pop-up 3 of the GUI of the input keys or the like (Step 308).

Next, the controller judges whether the pressing force falls below the input termination threshold value (Step 309). In the case where the pressing force is not below the input termination threshold value (No in Step 309), the controller 41 judges whether the prescribed time period T1 has elapsed since the pressing force exceeds the input determination threshold value (Step 310).

With reference to FIG. 11, the prescribed time period T1 is set to be longer than a time period T0, which is generally necessary for the pressing operation of the input operation surface 22a of the touch panel 22a by the user.

In the case where the prescribed time period T1 has not elapsed since the pressing force exceeds the input determination threshold value (No in Step 310), the process returns to Step 309, and the controller 41 judges whether the pressing force falls below the input termination threshold value.

On the other hand, in the case where the prescribed time period T1 has elapsed since the pressing force exceeds the input determination threshold value (Yes in Step 310), the input determination process of the GUI of the input keys or the like displayed on a position corresponding to the contact position of the finger of the user within the input operation surface 22a is carried out (Step 311).

It should be noted that in the case where the input determination process is carried out, the controller 41 may perform a process of highlighting the pop-up 3 of the GUI of the input keys which has been subjected to the input determination. Alternatively, the controller 41 may drive the vibration unit, thereby providing the vibration feedback to the user.

Next, the controller 41 judges whether a cycle time period T2 has elapsed since the preceding input determination process is performed (Step 312). With reference to FIG. 11, the cycle time period T2 is set to be shorter than the prescribed time period T1.

In the case where the cycle time period T2 has elapsed since the preceding input determination process is performed (Yes in Step 312), the process returns to Step 311, and the controller 41 carries out the input determination process. Then, the controller 41 judges again whether the cycle time period T2 has elapsed since the preceding input determination process is performed (Step 312).

On the other hand, in the case where cycle time period T2 has not elapsed since the preceding input determination process is performed (No in Step 312), the controller 41 judges whether the pressing force falls below the input termination threshold value (Step 313).

In the case where the pressing force is not a value lower than the input termination threshold value (No in Step 313), the controller 41 performs the process of Step 312 again. On the other hand, in the case where the pressing force falls below the input termination threshold value (Yes in Step 313), the process returns to Step 301, and the controller 41 performs the processes of Steps 301 and subsequent thereto.

By the processes shown in FIG. 10, when the user performs the long pressing of the touch panel 20 through the input operation surface 22a, it becomes possible to perform the continuous input of the GUI of the input keys or the like. For example, the user touches the position on which a back space key of the software keyboard is displayed with the finger and continues to press the touch panel 20 with the finger, thereby making it possible to perform the continuous input of the back space key.

(Change of Prescribed Time Period T1 Based on Output of acceleration sensor 43)

Next, a description will be given on a process in the case where the controller 41 changes the prescribed time period T1 on the basis of the output of the acceleration sensor 43. It should be noted that in the following description, a time period as a reference of the prescribed time period T1 is referred to as a reference prescribed time period.

In this case, for example, the controller 41 judges the degree of the acceleration from the output of the acceleration sensor 43 and performs a threshold judgment of the degree of the acceleration. In the case where the degree of the acceleration does not exceed the threshold value, the reference prescribed time period is set as the prescribed time period T1. On the other hand, in the case where the degree of the acceleration exceeds the threshold value, the prescribed time period T1 is set to be larger than the reference prescribed time period.

By the process described above, in accordance with the degree of the acceleration applied to the mobile phone 100, the prescribed time period T1 is increased. Therefore, for example, in the case where the acceleration applied to the mobile phone 100 is large due to the shaking or the like of the train, if the user unconsciously performs the long pressing of the touch panel 20, it is possible to prevent the continuous input from being unintentionally started.

It should be noted that as a method of increasing the prescribed time period T1, in accordance with the degree of the acceleration, a method of increasing the prescribed time period stepwise, in a linear function manner, or in a multi-dimensional function manner is used, for example.

In addition, the degree of acceleration may be a degree of acceleration in the z-axis direction, or a degree of a combined value of accelerations in two-axis directions or three-axis directions.

<Third Embodiment>

Next, a third embodiment of the present disclosure will be described. In the third embodiment, the timings at which the input determination process is performed are different from the case of the above embodiments. Therefore, the point will be mainly described.

Figure 12:
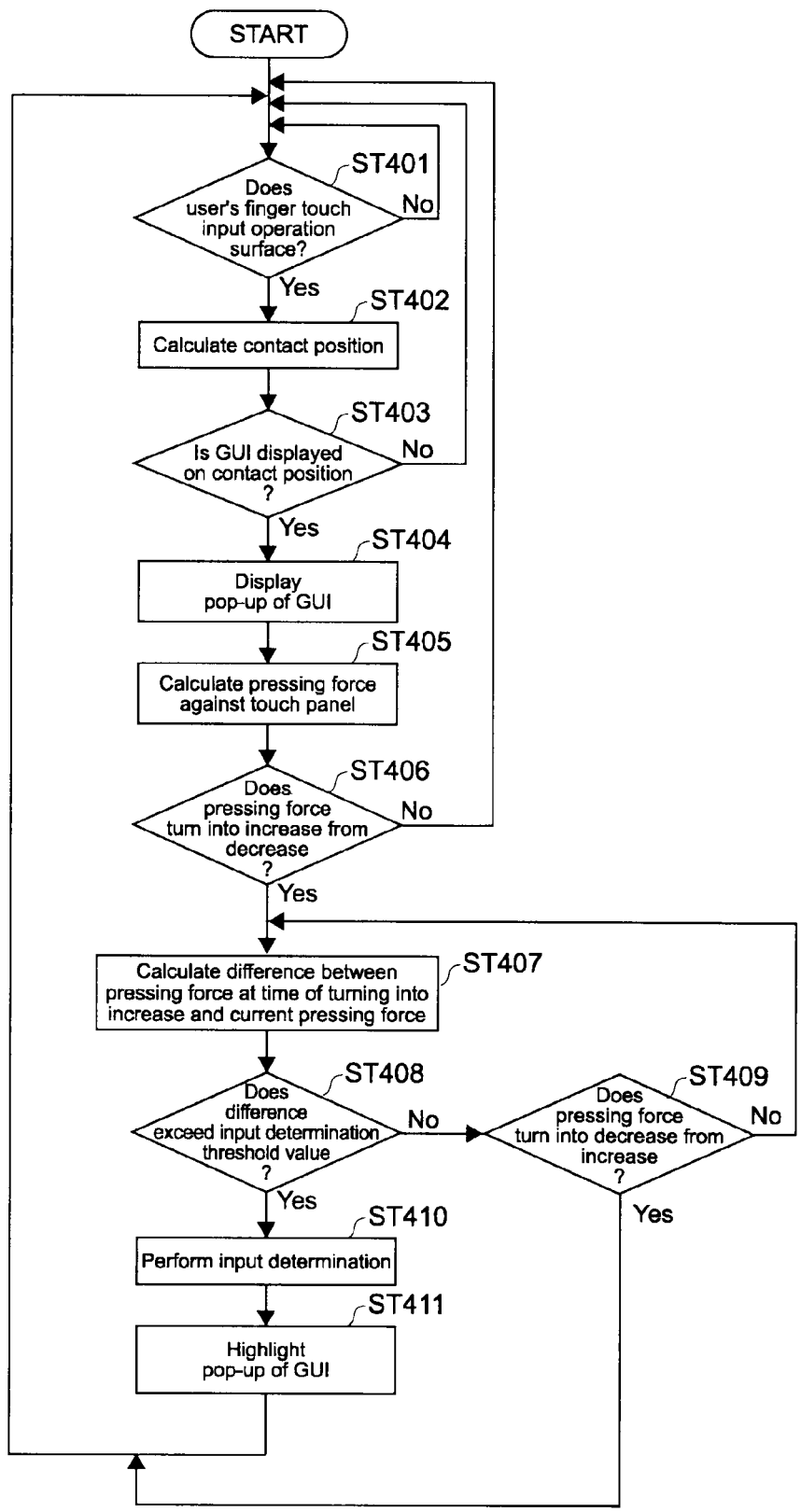
FIG. 12 is a flowchart showing a process of the controller of a mobile phone according to another embodiment of the present disclosure.
Figure 13:
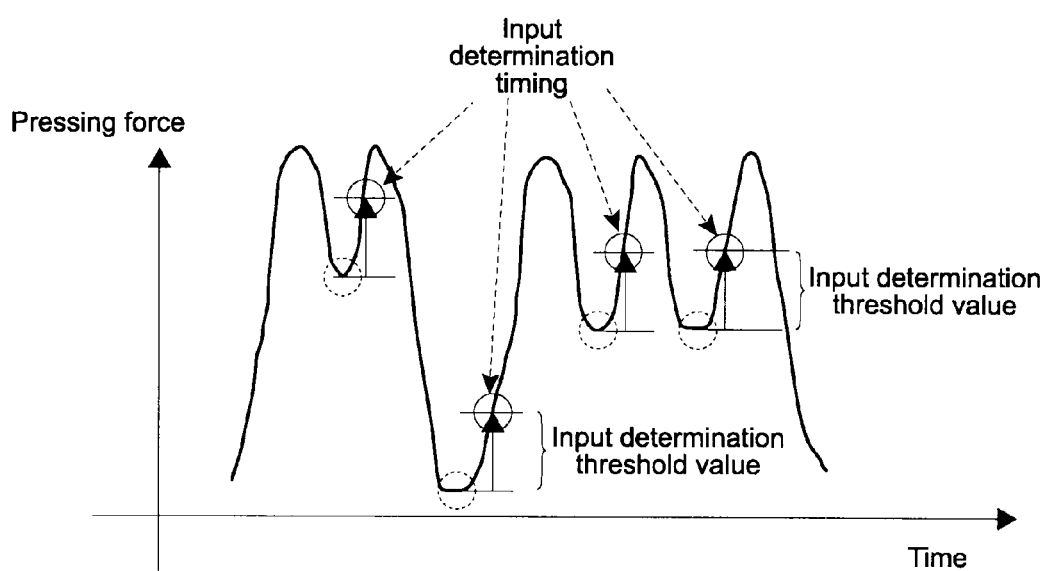
FIG. 13 is a diagram showing an example of a change of the pressing force and showing an input determination timing in the case where the process shown in FIG. 12 is performed.

FIG. 12 is a flowchart showing the process of the controller 41 of the mobile phone 100 according to the third embodiment. FIG. 13 is a diagram showing an example of the change of the pressing force, and showing input determination timings in the case where the process shown in FIG. 12 is performed.

In Steps 401 to 405 shown in FIG. 12, the same processes are performed as in Steps 101 to 105 shown in FIG. 4.

In Step 406, the controller 41 judges whether the pressing force against the touch panel 20 is turned into an increase from a decrease. In the case where the pressing force of the touch panel 20 is not turned into the increase (No in Step 406), the process returns to Step 401, and the controller performs Step 401 again.

On the other hand, in the case where the pressing force of the touch panel 20 is turned into the increase (Yes in Step 406) (see, broken lined circles of FIG. 13), the controller 41 then performs the next process of Step 407. In Step 407, the controller 41 calculates a difference between the pressing force at the time of turning into the increase and a current pressing force. That is, the controller 41 calculates the amount of change of the pressing force in the case where the pressing force at the time of turning into the increase is set as a reference.

Next, the controller 41 judges whether the difference calculated in Step 407 exceeds the input determination threshold value (see, FIG. 13) (Step 408). In the case where the difference does not exceed the input determination threshold value (No in Step 408), the controller 41 judges whether the pressing force is turned into the decrease from the increase (Step 409). It should be noted that the (reference) input determination threshold value in the third embodiment is set to be smaller than the (reference) input determination threshold value described in the above embodiments.

In the case where the pressing force is turned into the decrease from the increase (Yes in Step 409), the process returns to Step 401, and the controller 41 performs the processes of Steps 401 and subsequent thereto.

On the other hand, in the case where the pressing force is not turned into the decrease (No in Step 409), the process returns to Step 407, and the controller 41 calculates the difference between the pressing force at the time of turning into the increase and the current pressing force again. Then, the controller 41 judges whether the difference exceeds the input determination threshold value (Step 408).

In Step 408, in the case where the difference exceeds the input determination threshold value (Yes in Step 408), the controller 41 performs the input determination process of the GUI of the input keys or the like (Step 410). Upon execution of the input determination process, the controller 41 temporarily highlights the pop-up 3 of the GUI which has been subjected to the input determination (Step 411).

Also in the third embodiment, as in the first embodiment, the controller 41 performs the process of changing the input determination threshold value on the basis of the output of the acceleration sensor 43.

That is, the controller 41 judges the degree of the acceleration on the basis of the output of the acceleration sensor 43 and performs the threshold judgment of the degree of the acceleration. In the case where the degree of the acceleration exceeds the threshold value, the input determination threshold value is changed, to set the input determination threshold value to be larger than the reference input determination threshold value.

Thus, the third embodiment exerts the same effect as the first embodiment. That is, in the case where the acceleration applied to the mobile phone 100 is large due to the shaking or the like of the train, even if the user unconsciously strongly holds the mobile phone 100, and the pressing force applied to the touch panel 20 is increased through the input operation surface 22a, it is possible to prevent the input determination process from being performed.

(Modified Example of Third Embodiment)

In the third embodiment, the description is given on the case where the input determination process is carried out in the case where the amount of change (difference) in the pressing force with the pressing force at the time of turning into the increase from the decrease as the reference exceeds the input determination threshold value. Alternatively, the input determination process may be performed in the case where the difference per predetermined time period exceeds the input determination threshold value. Also in this case, the controller 41 performs the process for changing the input determination threshold value in accordance with the degree of the acceleration.

Various Modified Examples

The (reference) input determination threshold value and the (reference) input termination threshold value may be set so as to be changed in accordance with an attribute or taste of a user. For example, in the case where the user is female, the user has a tendency to want to set the (reference) input determination threshold value to be smaller than the case of a male user. In view of this, for example, with the use of information such as the age and sex which is registered in advance, the (reference) input determination threshold value may be changed on the basis of login information to the mobile phone 100. Alternatively, the user may be allowed to change the (reference) input determination threshold value in the software manner in accordance with the taste of the user. Alternatively, the rate of changes in the input determination threshold value, the input termination threshold value, and the prescribed time period T1 may be changed on the basis of the login information.

In the above description, as an example, the acceleration sensor 43 is used as the movement detection sensor for detecting the movement (sway) of the mobile phone 100. The movement detection sensor is not limited to this. In addition to the acceleration sensor 43, an angular velocity sensor (for example, vibration gyro sensor), an angular sensor (for example, geomagnetic sensor), a velocity sensor (for example, pitot tube), and the like may be used as the movement detection sensor. Alternatively, the movement detection sensor may be a combination of two or more sensors mentioned above. Typically, the movement detection sensor may be any sensor as long as the movement of the mobile phone 100 can be detected.

In the above description, as the example of the pressure sensitive sensor 30, the capacitive pressure sensitive sensor 30 is used. However, the pressure sensitive sensor 30 may be a strain gauge or the like. Typically, the pressure sensitive sensor 30 may be any sensor as long as the pressing force applied to the input unit such as the touch panel 20 can be detected.

In the above description, as the example of the touch panel 20, the capacitive touch panel 20 is used, but the touch panel is not limited to this. For example, the touch panel 20 may be a resistive touch panel, a static induction touch panel, an infrared touch panel, or a surface acoustic wave touch panel.

In the above description, as the example of the input unit operated by the user, the touch panel 20 is used, but the input unit is not limited to the touch panel 20. For example, the input unit may be a touch pad. In this case, the user presses the input operation surface of the touch pad, thereby performing the input determination process.

In the above embodiments, as the example of the electronic apparatus, the mobile phone 100 is used, but the electronic apparatus is not limited to the mobile phone 100. Examples of the electronic apparatus include a PDA (personal digital assistance), a portable music player, a digital camera, and a laptop PC.

The present disclosure contains subject matter related to that disclosed in Japanese Priority Patent Application JP 2010-168925 filed in the Japan Patent Office on Jul. 28, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
a casing;
a movement detection sensor configured to detect a movement of the casing;

an input unit having an input operation surface, the input unit being provided to the casing and capable of detecting an input operation position within the input operation surface;
a pressing force detection sensor configured to detect a pressing force applied to the input unit through the input operation surface; and
a control unit configured to judge whether one of the pressing force detected and an amount of a change based on the change in the pressing force, exceeds a first threshold value, perform a process of an input determination in a case where the one of the pressing force and the amount of the change in the pressing force exceeds the first threshold value, and change the first threshold value in accordance with a degree of the movement of the casing detected,
wherein the control unit judges whether the pressing force that exceeds the first threshold value falls below a second threshold value that is smaller than the first threshold value, and restricts, during a time period from when the pressing force exceeds the first threshold value until the pressing force falls below the second threshold value, the process of the input determination based on a fact that the pressing force exceeds the first threshold value.

2. The electronic apparatus according to claim 1, wherein the control unit changes the second threshold value in accordance with the degree of the movement of the casing.

3. The electronic apparatus according to claim 1, wherein the control unit judges whether a predetermined time period elapses from when the pressing force exceeds the first threshold value before the pressing force falls below the second threshold value, and in a case where the predetermined time period elapses, performs the process of the input determination in a predetermined cycle during a time period from when the predetermined time period elapses until the pressing force falls below the second threshold value.

4. The electronic apparatus according to claim 3, wherein the control unit changes the predetermined time period in accordance with the degree of the movement of the casing.

5. The electronic apparatus according to claim 1, wherein the control unit judges whether the pressing force turns into an increase from a decrease, in a case where the pressing force turns into the increase, calculates the amount of the change in the pressing force with the pressing force at a time of turning into the increase as a reference, judges whether the calculated amount of the change in the pressing force exceeds the first threshold value, and in a case where the change in the pressing force exceeds the first threshold value, performs the process of the input determination.

6. The electronic apparatus according to claim 1, wherein the control unit calculates the amount of the change in the pressing force during a predetermined time period, judges whether the calculated amount of the change in the pressing force exceeds the first threshold value, and performs the process of the input determination in a case where the amount of the change in the pressing force exceeds the first threshold value.

7. A processing method, comprising:
detecting a movement of a casing;
detecting a pressing force applied to an input unit through an input operation surface, the input unit having the input operation surface, being provided to the casing, and being capable of detecting an input operation position within the input operation surface;
judging whether one of the pressing force detected and an amount of a change based on the change in the pressing force, exceeds a first threshold value;
performing a process of an input determination in a case where the one of the pressing force and the amount of the change in the pressing force exceeds the first threshold value;
changing the first threshold value in accordance with a degree of the movement of the casing detected,
judging whether the pressing force that exceeds the first threshold value falls below a second threshold value that is smaller than the first threshold value; and
restricting, during a time period from when the pressing force exceeds the first threshold value until the pressing force falls below the second threshold value, the process of the input determination based on a fact that the pressing force exceeds the first threshold value.

8. A non-transitory computer-readable medium storing computer readable instructions thereon that when executed by a computer cause the computer to perform a method comprising:
detecting a movement of a casing,
detecting a pressing force applied to an input unit through an input operation surface, the input unit having the input operation surface, being provided to the casing, and being capable of detecting an input operation position within the input operation surface,
judging whether one of the pressing force detected and an amount of a change based on the change in the pressing force exceeds a first threshold value,
performing a process of an input determination in a case where the one of the pressing force and the amount of the change in the pressing fore; exceeds the first threshold value, and
changing the first threshold value in accordance with a degree of the movement of the casing detected,
judging whether the pressing force that exceeds the first threshold value falls below a second threshold value that is smaller than the first threshold value, and
restricting, during a time period from when the pressing force exceeds the first threshold value until the pressing force falls below the second threshold value, the process of the input determination based on a fact that the pressing force exceeds the first threshold value.

* * * * *